United States Patent [19]

Schuitemaker

[11] Patent Number: 4,828,177

[45] Date of Patent: May 9, 1989

[54] ADJUSTABLE SPRAYER ASSEMBLY

[76] Inventor: Frans Schuitemaker, Rte. 1, Box 640, Knightdale, N.C. 27545

[21] Appl. No.: 134,957

[22] Filed: Dec. 18, 1987

[51] Int. Cl.$^4$ .............................................. B05B 1/20
[52] U.S. Cl. .................................. 239/165; 239/176; 239/722
[58] Field of Search ................. 239/71, 159, 164, 165, 239/176, 172, 722, 726; 180/906; 280/43, 43.15, 43.16, 83

[56] References Cited

U.S. PATENT DOCUMENTS

| | | | |
|---|---|---|---|
| 1,924,144 | 8/1933 | Woodcock et al. | 239/71 |
| 2,243,597 | 5/1941 | Elliott | 222/609 |
| 2,596,390 | 5/1952 | Essick | 280/43 |
| 2,867,960 | 1/1959 | Stiles et al. | 280/43 |
| 3,106,344 | 10/1963 | Baird, Jr. et al. | 239/159 |
| 3,490,695 | 1/1970 | Rittenhouse | 239/159 |
| 4,269,356 | 5/1981 | Rose | 239/176 |
| 4,350,222 | 9/1982 | Lutteke et al. | 180/906 |
| 4,602,742 | 7/1986 | Penson | 239/176 |
| 4,638,948 | 1/1987 | Marlek | 239/722 |

FOREIGN PATENT DOCUMENTS

1013198 7/1952 France ................................ 239/165

Primary Examiner—Andres Kashnikow
Assistant Examiner—Karen B. Merritt
Attorney, Agent, or Firm—Steven Hultquist

[57] ABSTRACT

An adjustable sprayer assembly includes a frame supported by a pivoting wheel assembly and a pair of side wheel assemblies arranged in a tricycle fashion. An adjustable spray boom assembly and an operator boom assembly are connected to the frame. A container of a substance to be sprayed is mounted on the frame and selectively sprayed through nozzles on the spray boom as the sprayer assembly is pushed or pulled by an operator. An electrical meter connected to a generator mounted on one of the wheel assemblies can be provided so that an operator can monitor and maintain the speed of the sprayer assembly.

19 Claims, 8 Drawing Sheets

ADJUSTABLE SPRAYER ASSEMBLY

BACKGROUND OF THE INVENTION

1. Field of the Invention

The present invention relates generally to a sprayer. In particular, the present invention is concerned with a portable, operator-propelled research sprayer which is quickly assembled and easily adjusted to accommodate various spraying techniques.

2. Description of the Related Art

Agricultural sprayers are used to apply agricultural chemicals. Generally, sprayers fall into one of three categories: (1) hand-held sprayers, (2) tractor-mounted sprayers and (3) operator-propelled sprayers.

Hand-held sprayers may include a back pack frame and padded straps for carying the chemical containers and other major components of the sprayer. The operator manipulates a spray boom to apply the chemical to crops. With hand-held sprayers, it is difficult to maintain a constant speed to control the amount of chemicals applied to crops. Also, it is difficult for an operator to maintain a constant position of the spray boom. Furthermore, the operator may tire from the burden of carrying the sprayer.

Tractor-mounted sprayers are hitched to a tractor and include a frame mounted on wheels for supporting the sprayer, and in some instances, the operator. Generally, tractor-mounted sprayers are not suitable for use in narrow rows due to crop injury or small plots due to the difficulty of maintaining constant speed.

Operator-propelled sprayers generally include a frame for supporting the sprayer assembly and at least one wheel assembly. "Bicycle sprayers" have a pair of laterally-spaced large wheel assemblies and a caster positioned behind each of the large wheel assemblies. Drawbacks of bicycle sprayers include the fact the most bicycle sprayers can only be pushed, thus requiring the operator to walk through a sprayed area. Oftentimes and particularly in damp soil, the casters tend to dig into the ground, thereby requiring more effort by the operator to push the sprayer. Many bicycle sprayers are inadequate for tall crops.

Single wheel sprayers are operator-propelled, and as the name suggests, have a single wheel assembly. Such sprayers are also known as "wheelbarrow type" sprayers. Single wheel sprayers work generally on low crops only and are difficult to manipulate. Since part of the sprayer weight is carried by the operator, it is difficult to maintain a constant speed and at the same time prevent the sprayer from swaying.

Consequently, the art continues to seek improvements. It is desirable that an operator-propelled sprayer be pushed or pulled at a constant speed to ensure uniformity of chemical deposits. An improved operator-propelled sprayer should be easily adjustable to accommodate various crops and spraying techniques. It is desirable that a sprayer be easily balanced, portable and enable an operator to spray crops without walking through a sprayed area.

SUMMARY OF THE INVENTION

The present invention provides an economical and portable operator-propelled sprayer, particularly useful for agricultural purposes. The sprayer can be disassembled in a matter of minutes and transported in the trunk of an automobile. The operator can easily push or pull the sprayer at a constant speed, and can adjust the sprayer to accommodate various crops and spraying techniques.

The present invention includes an adjustable sprayer assembly having a frame supported by a pivoting wheel assembly and a pair of side wheel assemblies arranged in a tricycle fashion. An adjustable spray boom assembly and an operator boom assembly are connected to the frame. A container of a substance to be sprayed may be mounted on the frame and selectively sprayed through nozzles on the spray boom assembly as the sprayer assembly is pushed or pulled by an operator. An electrical meter connected to a generator mounted on one of the wheel assemblies may be provided so that an operator can monitor and maintain the speed of the sprayer assembly.

DETAILED DESCRIPTION OF THE PREFERRED EMBODIMENT

Figure 1:
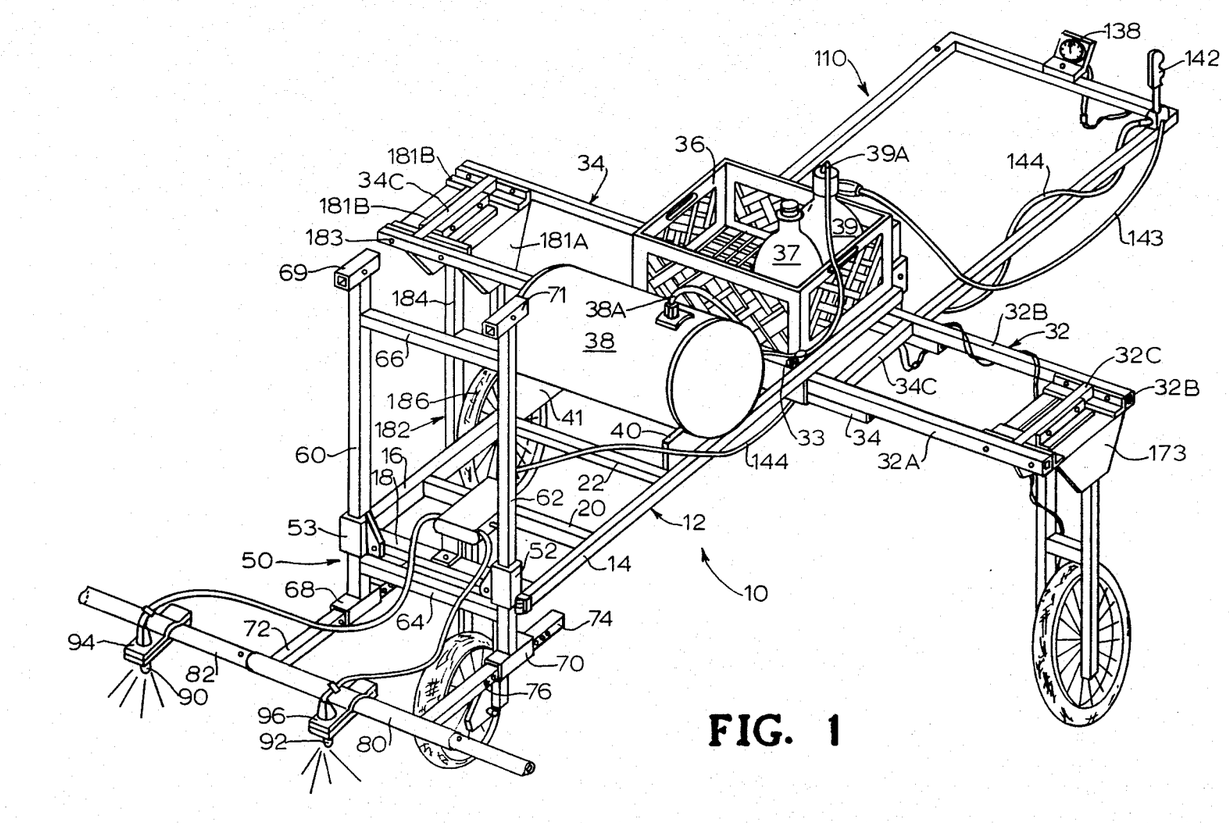
FIG. 1 is a perspective view of a preferred embodiment of the present adjustable sprayer assembly.
Figure 2:
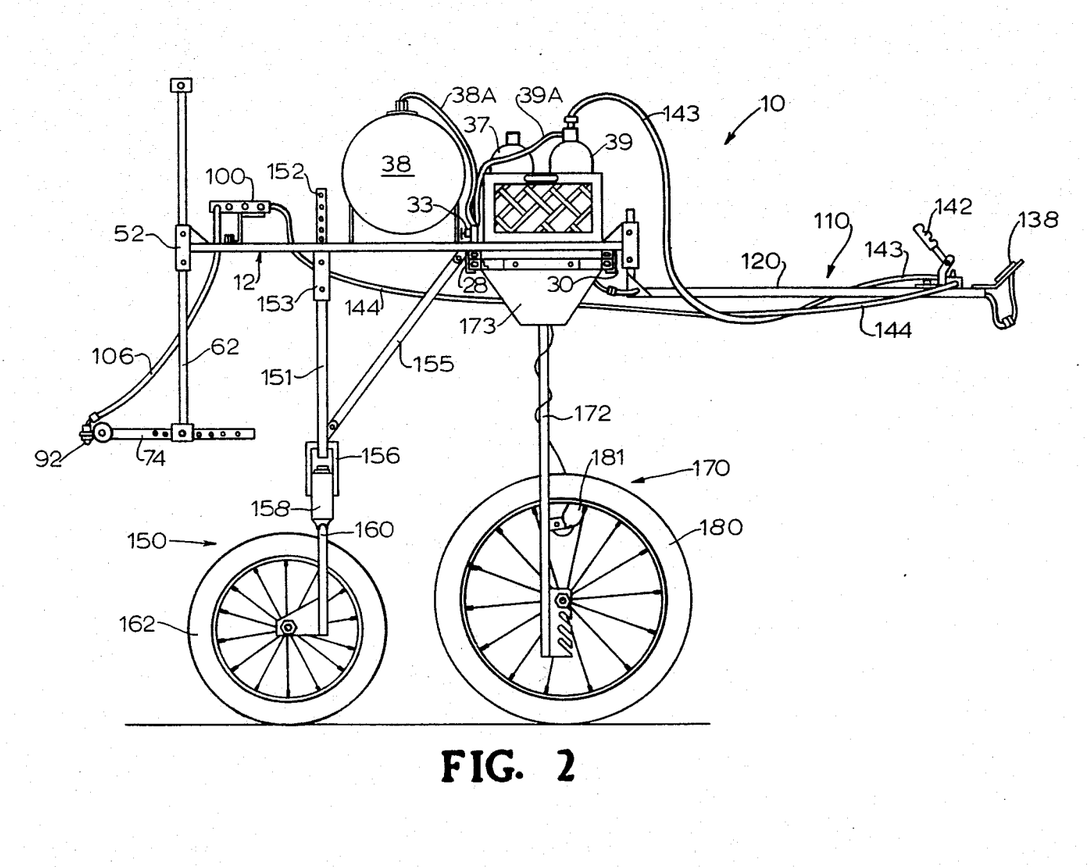
FIG. 2 is a side elevational view of sprayer assembly of FIG. 1.

A preferred embodiment of the present sprayer, indicated generally at 10, is illustrated in FIGS. 1 and 2. Throughout the description, reference to "upper", "lower", "vertical", "horizontal" and the like are with respect to the orientation of the preferred embodiment in the drawings. Such references are not intended as limitations to the invention.

Figure 3:
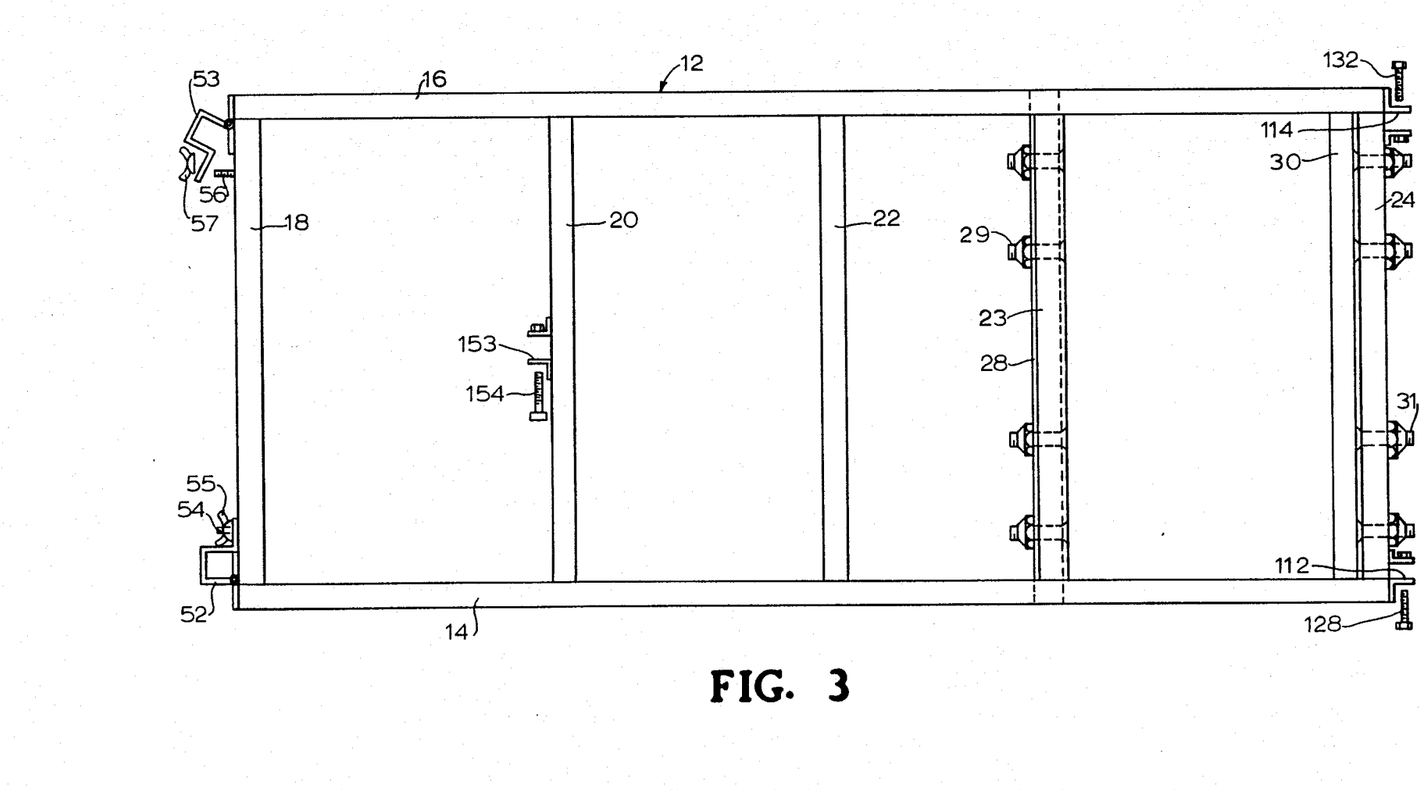
FIG. 3 is a top plan view of a frame of the sprayer assembly.

The sprayer 10 includes a rectangular frame, indicated generally at 12 and illustrated best in FIG. 3, having side elements 14, 16. Cross braces 18, 20, 22, 23, 24 are secured between side elements 14, 16 to form and strengthen the frame 12. Elements 14, 16, 18, 20, 22, 23, 24 are illustrated as tubular members. However, other constructions are within the scope of the present invention.

Figure 4:
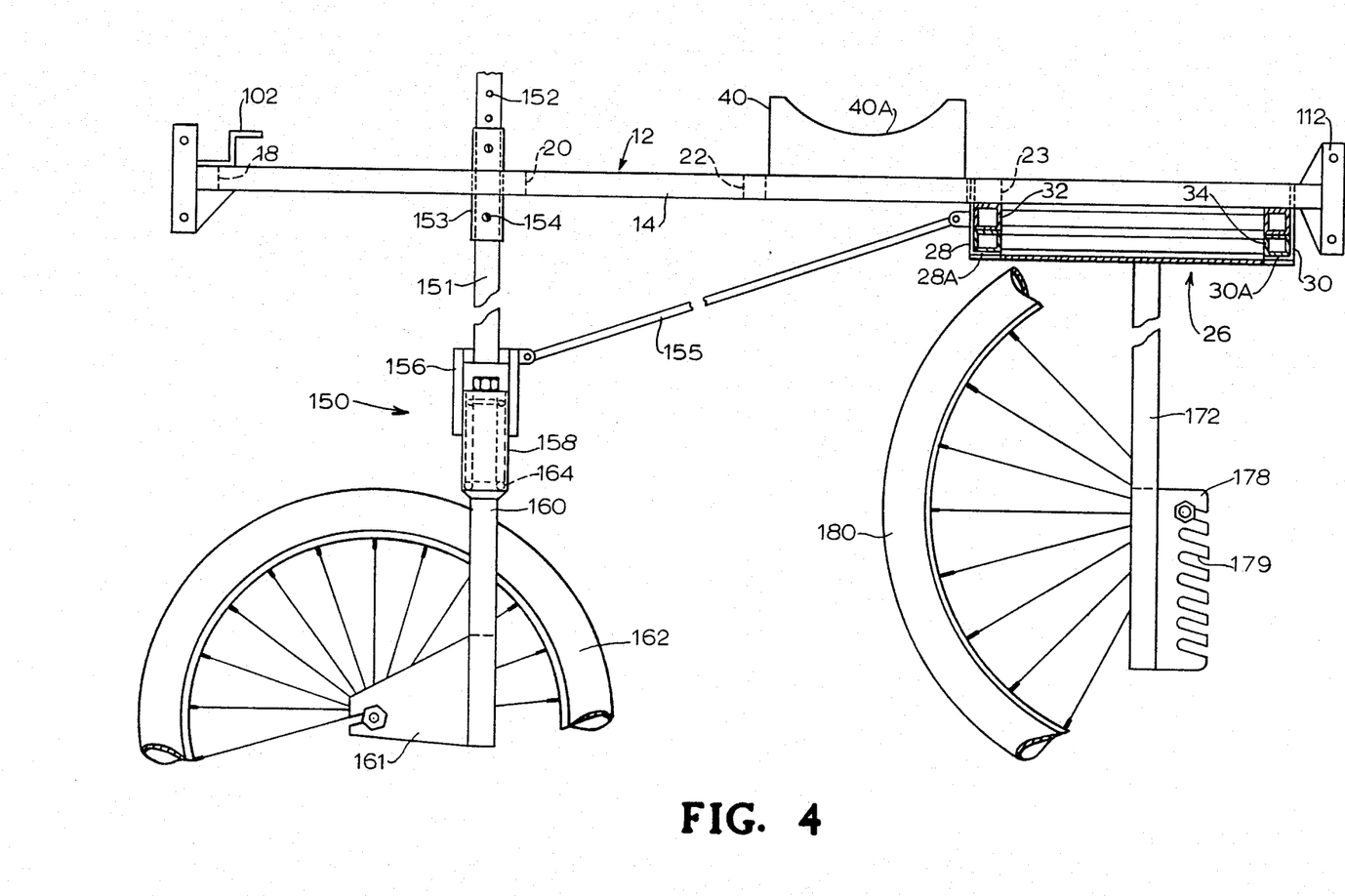
FIG. 4 is an enlarged, fragmentary side elevational view of the frame, the caster wheel assembly and a side wheel assembly.
Figure 5:
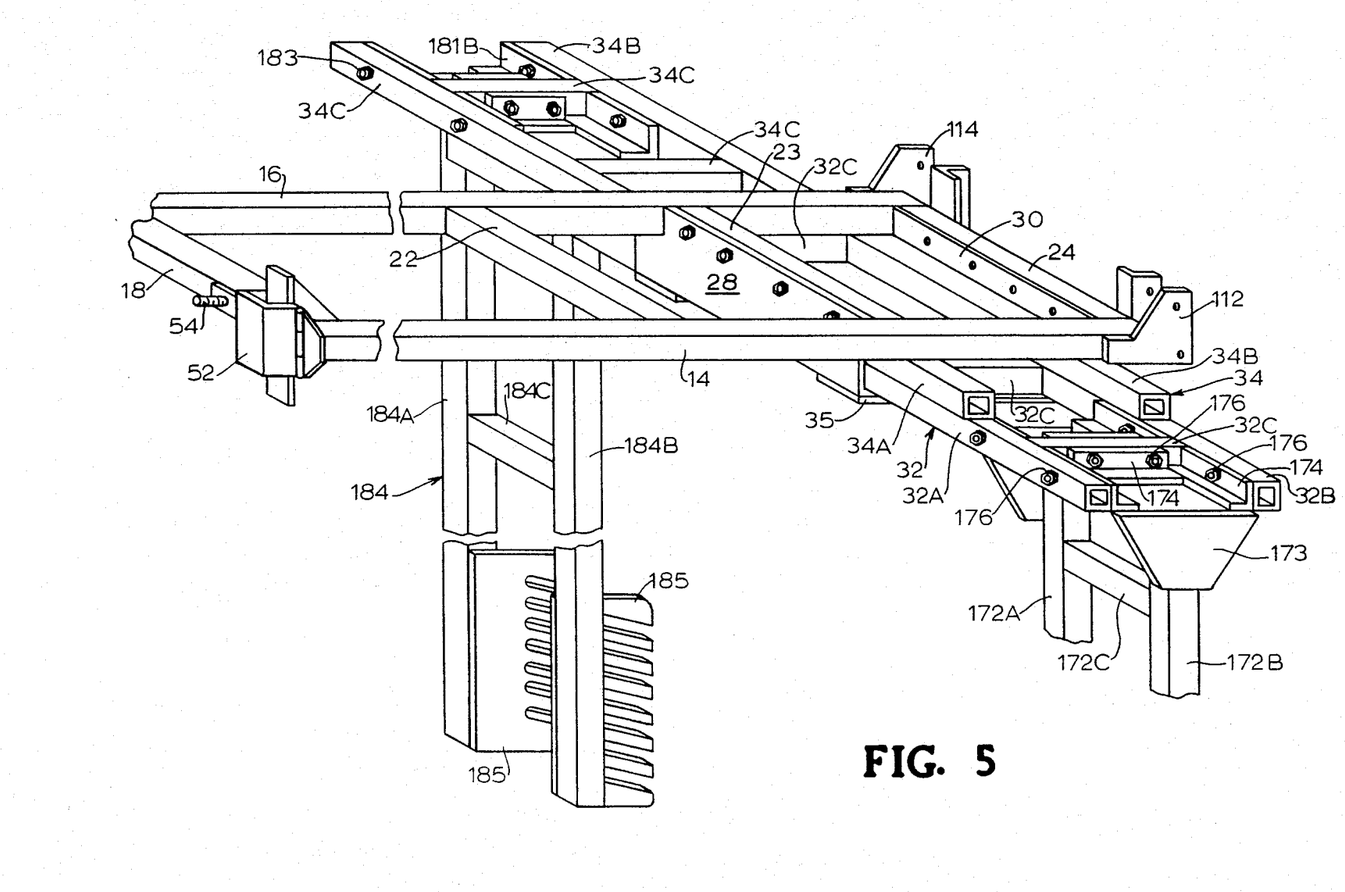
FIG. 5 is an enlarged, fragmentary perspective view of the frame and the slidable arms.

A slot 26, illustrated best in FIGS. 4 and 5, is formed below the frame 12. Angle iron 28 is mounted on cross brace 23 by any suitable means, e.g., by fasteners 29 (see FIG. 3). Angle iron 30 is mounted on cross brace 24 by any suitable means, e.g., by fasteners 31. Angle irons 28, 30 are oriented so that the lower surface 28A, 30A of each angle iron 28, 30, respectively, is directed towards the other to form the slot 26. The slot 26 receives a pair of slidable arms 32, 34. If desired, a plate 35 can be secured to the bottoms of lower surfaces 28A, 30A.

Slidable arm 32 includes a pair of side elements 32A, 32B illustrated as tubular members. Braces 32C are connected between side elements 32A, 32B to form and strengthen slidable arm 32. In a similar manner, slidable arm 34 includes side elements 34A, 34B and braces 34C. Other constructions for side elements 32A, 32B, 34A, 34B and braces 32C, 34C are within the scope of the present invention.

Frame 12 supports a basket 36, a pressure tank 38, a spray boom assembly 50 and an operator boom assembly 110. As illustrated in FIG. 1, basket 36 rests on frame 12 and can be framed by side elements 14 and 16 and cross braces 23 and 24. Basket 36 may support spray containers 37, 39 and any other suitable items. A pressure regulator 33 is connected by hose 38A to pressure tank 38 and by hose 39A to spray container 39.

Pressure tank 38 is supported by mounting plates 40, 41 each of which has an arcuate recess 40A, 41A, respectively, complementary to the circumference of the pressure tank 38. Mounting plates 40, 41 can be mounted on side elements 14, 16 between cross braces 22, 23 by any suitable means, e.g., by welding.

The spray boom assembly 50 includes vertical bars 60, 62 and is connected to the frame 12 by clamps 52, 53 mounted on cross brace 18. As illustrated best in FIG. 3, clamp 52 is secured to cross brace 18 by fastener 54 and wingnut 55. In a similar manner, clamp 53 is secured to cross brace 18 by fastener 56 and wingnut 57. After a clamp 52, 53 receives its respective vertical bar 60, 62, respective wingnut 55, 57 is tightened on respective fasteners 54, 56 to lock the spray boom assembly 50 in a vertical position.

Figure 7:
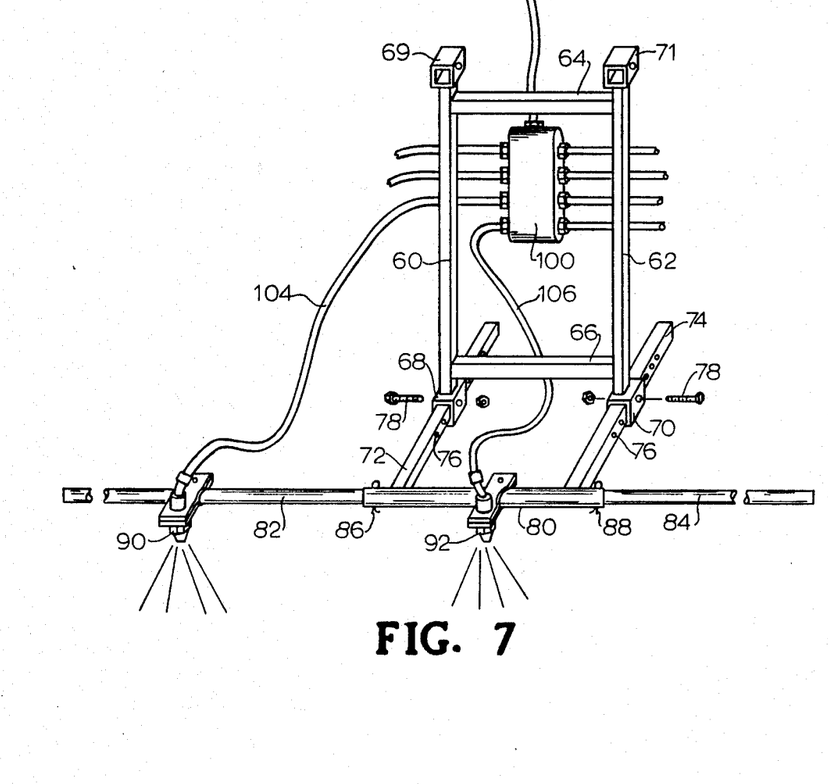
FIG. 7 is a perspective view of a spray boom assembly disconnected from the sprayer assembly.

As illustrated best in FIG. 7, braces 64, 66 are connected between vertical bars 60, 62 for stabilization. For short crops, slots 68, 70 are provided at the lower ends of vertical bars 60, 62 to receive horizontal bars 72, 74, respectively. For tall crops, slots 69, 71 are provided at the upper ends of vertical bars 60, 62 to receive horizontal bars 72, 76, respectively. Each horizontal bar 72, 74 includes a plurality of openings 76 which receive fasteners 78 to position the horizontal bars 72, 74 as desired. A cross bar 80 is secured to horizontal bars 72, 74. Removable booms 82, 84 are secured to cross bar 80 by pins 86, 88, respectively. Brackets 94, 96 mounting spray nozzles 90, 92 are clamped to boom 82 and cross bar 80 as desired. Additional nozzles can be utilized with the sprayer 10 and can be positioned as desired on cross bar 80 and booms 82, 84.

A manifold 100 is mounted on cross brace 18 by bracket 102 (See FIGS. 2 and 4). Hoses 104, 106 are connected between manifold 100 and nozzles 90, 92, respectively. Additional hoses can be connected between manifold 100 and any additional nozzles utilized with sprayer 10.

Figure 8:
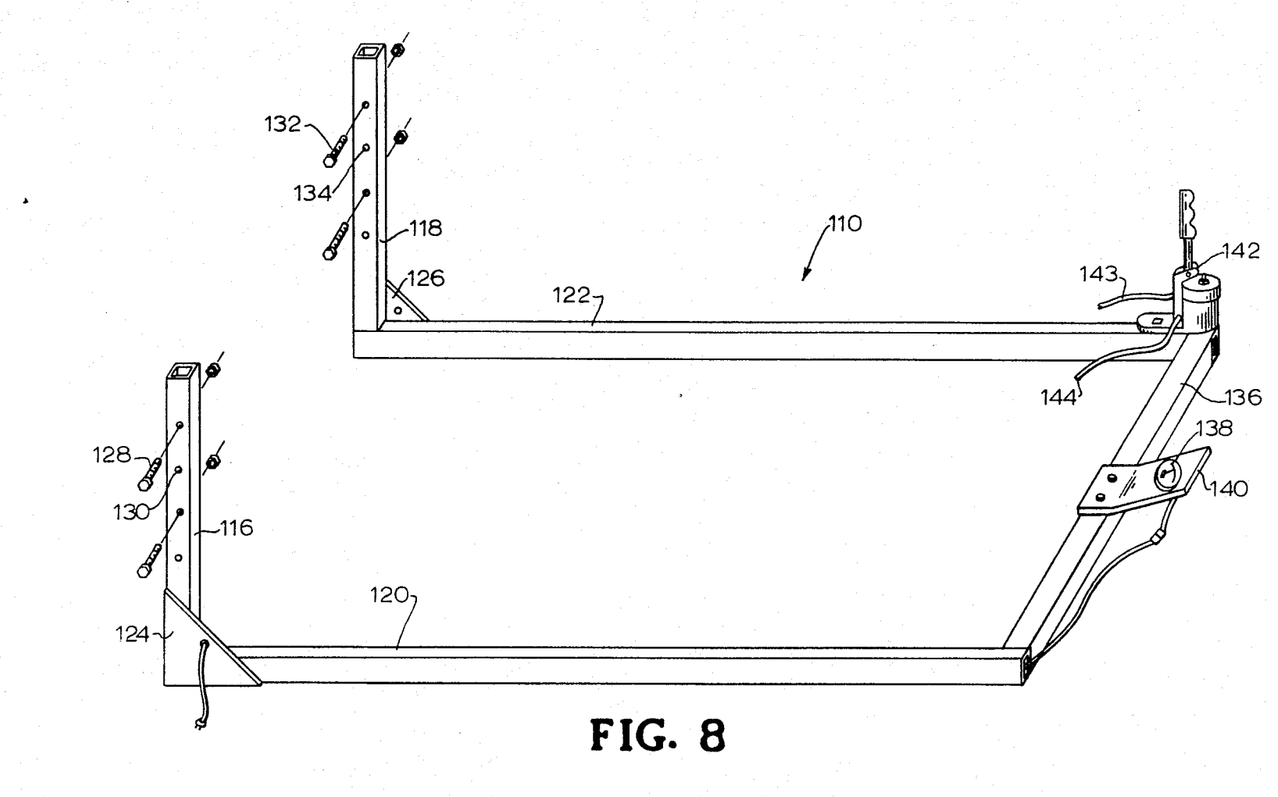
FIG. 8 is a perspective view of an operator boom assembly disconnected from the sprayer assembly.

The operator boom assembly 110 is connected to the frame 12 by brackets 112, 114 mounted on cross brace 24. As illustrated best in FIG. 8, operator boom assembly 110 includes a pair of vertical bars 116, 118 and a pair of horizontal bars 120, 122 connected at right angles, respectively. Braces 124, 126 are provided to stabilize operator boom assembly 110. Fasteners 128 are received through bracket 112 and selected openings 130 on bar 116 to srecure the bar 116 to frame 12. Fasteners 132 are received through bracket 114 and selected openings 134 on bar 118 to frame 12. Cross bar 136 is secured between bars 120, 122 opposite bars 116, 118. A voltmeter 138 is mounted on cross bar 136 by bracket 140. A shut-off valve 142 is mounted on cross bar 136. Valve 142 can be mounted on any of bars 136, 120, 122 depending upon the preference of the operator. Hose 143 is connected between valve 142 and spray container 39. Hose 144 is connected between valve 142 and manifold 100.

The frame 12 is supported by a pivoting wheel, e. g., a caster assembly 150, and a pair of side wheel assemblies 170, 182. For purposes of this disclosure, the term "pivoting wheel" is intended to be broadly constructed to include any and all motively translatable support means, including, but not limited to, wheels and spheres capable of omni-directional motion. Caster assembly 150 includes a leg 151 having a plurality of openings 152 at its upper end. A caster wheel bracket 153, mounted on cross brace 20, and fasteners 154 adjustably connect the leg 151 to cross brace 20. Brace 155 is pivotally connected between leg 151 and cross brace 23. At the lower end of the leg 151, a tube 156 mounts a bearing housing 158 supporting a pivotable U-shaped tube 160. The lower end of fork 160 includes a bracket 161 for receiving wheel 162. Bearings 164 in bearing housing 158 permit form 160 to swivel with respect to leg 151.

In the alternative, a multi-slotted bracket 185 (FIG. 5) can be incorporated with caster assembly 150 and substituted for bracket 161 to permit additional height adjustment of frame 12.

Side wheel assembly 170 includes a fork 172 having side elements 172A, 172B and braces 172C. Fork 172 is connected at its upper end 172A to slidable arm 32 by top plate 173, bracket elements 174 and fasteners 176, as illustrated best in FIG. 5. As illustrated in FIG. 1, the lower end 172B of fork 172 mounts a wheel 180. In the alternative, as illustrated in FIGS. 2 and 4, the lower end 174B of fork 172 includes a multi-slotted bracket 178 mounting wheel 180. The slots 179 of bracket 178 permit height adjustment of the frame 12. A generator 181 is mounted on fork 172 and positioned in contact with wheel 180 so that generator 180 will produce electrical energy.

In a similar manner, side wheel assembly 182 includes a fork 184 connected to slidable arm 34 by top plate 181A, bracket elements 181B and fasteners 183. Fork 184 includes side elements 184A, 184B and braces 184C. At its lower end, slidable arm 34 mounts a wheel 186. It is desirable that fork 184 include a multi-slotted bracket 185 (illustrated only in FIG. 5), similar to bracket 178 to permit height adjustment of frame 12. The distance between wheels 180, 186 can be adjusted by sliding arms 32, 34, in slot 26.

Figure 6:
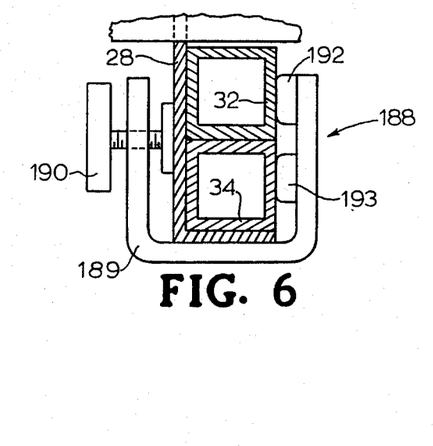
FIG. 6 is a greatly enlarged partially-sectional view of a clamp assembly for locking the slidable arms into place.

Slidable arms 32, 34 are locked in position in slot 26 by a clamp assembly 188, illustrated only in FIG. 6. Clamp assembly 188 includes U-shaped slot member 189 for receiving angle iron 28 and side elements 32A and 34A of slidable arms 32, 34, respectively. A threaded lock 190 is mounted on one side of slot member 189 and friction pads 192, 193 are mounted on the opposite side of slot member 189. Clamp assembly 188 is positioned beneath frame 12 between side elements 14, 16. Lock 190 is turned until lock 190 forces pads 192, 193 into contact with side elements 32A, 34A, respectively. Alternatively, or in combination, a clamp assembly 188 can be mounted on angle iron 30 and side members 32B, 34B.

For use, the height of the frame 12 is adjusted to a suitable position depending upon the type of crop and its stand. First, leg 151 is connected to frame 12 at a selected opening 152 by bracket 153 and fasteners 154. If a multi-slotted bracket 165 is incorporated with the caster assembly 150, wheel 162 is mounted on bracket 165 to further adjust the height of frame 12. Wheels 180, 186 are mounted on multi-slotted brackets 178 to adjust the rear portion of the frame 12.

The position of the spray boom assembly 50 is adjusted to accommodate the particular crop being sprayed. Horizontal bars 72, 74 are received in either slots 68, 70 for short crops or slots 69, 71 for tall crops. Fasteners 78 secure horizontal bars 72, 74 at a selected opening 76 away from frame 12. Spray nozzles 90, 92 are selectively positioned in cross bar 80 and bar extensions 82, 84.

The distance between side wheels 180, 186 is adjusted by sliding slidable arms 32, 34 in slot 26. Clamp assembly 188 locks slidable arms 32, 34 in slot 26.

Figure 9:
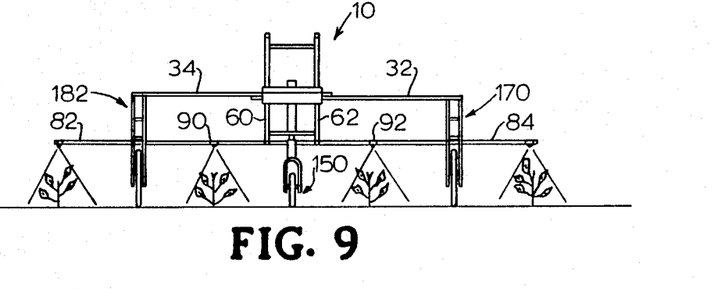
FIGS. 9-11 are front elevational views of the sprayer assembly adjusted for various crops and spraying techniques.
Figure 10:
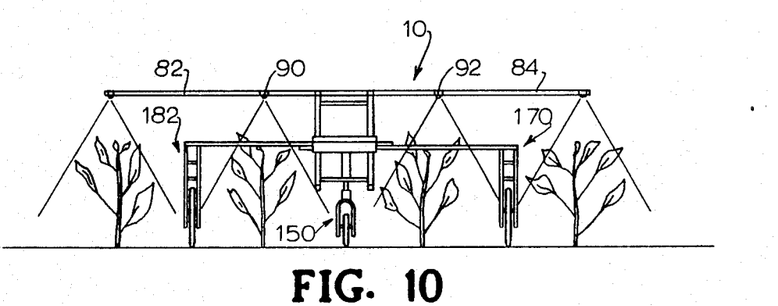
Figure 11:
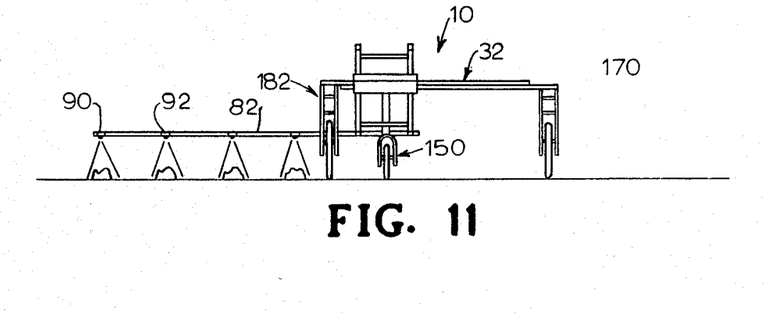

Several positions of the sprayer 10 are illustrated in FIGS. 9–11. In FIG. 9, the horizontal bars 72, 74 are mounted in slots 68, 70, so that spray boom assembly 50 is positioned for low crop spraying. A tall crop spraying position is illustrated in FIG. 10 wherein horizontal bars 72, 74 are received in slots 69, 71. Off-set spraying is illustrated in FIG. 11 wherein nozzles 90, 92 are mounted on boom extension 82.

During operation, an operator stands within the area outlined by bars 120, 122, 136 with his or her back to cross brace 24 so that voltmeter 138 and valve 142 are readily accessible. The sprayer assembly 10 is pulled as the operator walks forward. The operator controls the speed of sprayer assembly 10 by the monitoring the voltmeter 138. The flow of a chemical is controlled by valve 142. In this mode, an operator walks ahead of the sprayed crops.

Alternately, an operator may push the sprayer assembly 10. Operator boom assembly 110 is removed and voltmeter 138 and valve 142 are mounted on cross brace 24. The operator faces cross brace 24 and pushes the sprayer assembly 10 by walking forward.

The sprayer assembly 10 can be easily disassembled and transported. Operator boom assembly 110 and spray boom assembly 50 are removed from frame 12 at their respective brackets and fasteners. Caster assembly 150 is removed from frame 12 at bracket 153. Slidable arms 32 and 34 are removed from slot 26. Basket 36 and pressure tank 38 are removed from frame 12. The components of the sprayer assembly 10 can be easily stored, e. g. in an automobile.

The tricycle arrangement of caster assembly 150 and side wheel assemblies 170, 182 provide a stable support for frame 12. Caster assembly 150 permits the sprayer assembly 10 to be turned as desired. The use of a voltmeter 138 enables an operator to monitor the speed of the sprayer assembly 10 to provide precision spraying. The sprayer assembly 10 is adjustable for low as well as tall crops as illustrated in FIGS. 9 and 10. For off-set spraying, as illustrated in FIG. 11, boom 82 mounts nozzles 90, 92 while slidable arm 32 is extended to balance the sprayer assembly 10.

Generator 181 produces a voltage which is directly proortional to the speed of the sprayer assembly 10. Voltmeter 138, electrically connected to the generator 181, permits a user to maintain constant speed of the sprayer assembly 10 by maintaining a constant voltage reading. Voltmeter 138 can be calibrated in any convenient format, e.g. miles/hour. Control of the speed of the sprayer assembly 10 is important for uniform and controlled deposits of agricultural chemicals. Accuracy of chamical deposits is particularly useful for reasearch sprayers and precision spraying. Of course, other means for monitoring speed of sprayer assembly 10 can be incorporated with the present invention and are within the spirit of the invention.

Although the present invention has been described with reference to a preferred embodiment, persons skilled in the art will recognize that numerous changes may be made in form and detail without departing from the spirit and scope of the invention.

What is claimed is:

1. An operator-propelled agricultural sprayer assembly of the push-pull type, comprising:
   (a) an elongate horizontal frame;
   (b) a pivoting wheel assembly vertically adjustably supporting said frame at a first end thereof, to selectively vary the height of the frame first end above a supporting surface;
   (c) a pair of laterally- and vertically-adjustable side wheel assemblies at a second end of said frame, each said side wheel assembly comprising:
      (i) a horizontal, laterally slidable arm;
      (ii) a wheel;
      (iii) vertically-adjustable support means mounting said wheel at a lower end thereof and joined at an upper end thereof to said laterally slidable arm, to selectively vary the height of the frame second end above a supporting surface;
   (d) a slot structure on said frame in which said laterally slidable arms of said side wheel assemblies are opposedly received and laterally slidably adjustable relative to one another, to selectively vary the lateral spacing between the wheels of the side wheel assemblies; and
   (e) a spray boom assembly vertically adjustably mounted on the frame, comprising:
      (i) laterally spaced-apart vertical bars, each of said vertical bars having a slot at an upper end and a lower end thereof;
      (ii) means for selectively and vertically adjustably securing each of said laterally spaced-apart vertical bars to said frame first end;
      (iii) a laterally extending cross bar, and laterally spaced-apart horizontal bars joined to said cross bar, said laterally spaced-apart horizontal bars being selectively and longitudinally adjustably securable in either the slots at the lower ends of the vertical bars, or the slots at the upper ends of the vertical bars; and
   (f) spraying means mounted on said frame.

2. A sprayer assembly according to claim 1, including an operator boom assembly removably connected to the frame.

3. A sprayer assembly according to claim 1, including means for monitoring the speed of the sprayer assembly.

4. A sprayer assembly according to claim 3, wherein the means for monitoring the speed of the sprayer assembly comprises:
   (a) a generator mounted on one of the side wheel assemblies and operatively connected to the wheel thereof to produce electrical energy; and
   (b) a voltmeter electrically connected to the generator and mounted on the sprayer assembly.

5. A sprayer assembly according to claim 1, wherein the pivoting wheel assembly comprises a caster assembly.

6. A sprayer assembly according to claim 5, wherein the caster assembly comprises:
   (a) a leg removably connected at a first end to the frame;

(b) a bearing housing connected at a second end of the leg;

(c) a U-shaped tube pivotally connected to the bearing housing; and (d) a wheel, mounted on the U-shaped tube, pivotable about the longitudinal axis of the leg.

7. A sprayer assembly according to claim 6, including a multi-slotted bracket mounted on the U-shaped tube for adjustably mounting the wheel.

8. A sprayer assembly according to claim 1, wherein the vertically adjustable support means of each side wheel assembly comprises a fork removably connected at its upper end to the laterally slidable arm.

9. A sprayer assembly according to claim 8, including a multi-slotted bracket mounted on the lower end of the fork for adjustably mounting the wheel.

10. A sprayer assembly according to claim 1, wherein the spraying means comprises:

(a) a container for receiving a substance to be sprayed, removably mounted on the frame;

(b) nozzle means, in communication with the container, removably mounted on the spray boom assembly; and (c) means for controlling the flow of the substance from the container to the nozzle means.

11. A sprayer assembly according to claim 10, wherein the nozzle means comprises a plurality of nozzles.

12. A sprayer assembly according to claim 11, including a manifold connected between the container and the nozzles.

13. A sprayer according to claim 1, including a clamp assembly for locking the laterally slidable arms in place in the slot means.

14. A sprayer assembly according to claim 1, wherein the pivoting wheel assembly and side wheel assemblies are arranged in a tricycle fashion.

15. A sprayer assembly according to claim 2, wherein the operator boom assembly comprises:

(a) a pair of vertical bars removably connected to the frame;

(b) a pair of horizontal bars each of which is connected at a first end thereof substantially perpendicularly to one of the pair of vertical bars; and (c) a cross bar joined at each of its ends to a second end of each said horizontal bar.

16. A sprayer assembly according to claim 1, wherein said elongate horizontal frame is of rectangular shape.

17. A sprayer assembly according to claim 1, comprising at least one boom coaxially and detachably secured to said cross-bar at a selected end thereof.

18. A sprayer assembly according to claim 2, comprising mounted on said operator boom (a) a voltmeter for monitoring the speed of the sprayer assembly, the voltmeter being electrically connected to a generator mounted one one of the side wheel assemblies and operatively connected to the wheel thereof to produce electrical energy for the voltmeter, and (b) valve control means for adjustably selecting the rate of application of a selected substance to be sprayed by the spraying means mounted on the frame.

19. A sprayer assembly according to claim 1, comprising mounted on the frame (a) a voltmeter for monitoring the speed of the sprayer assembly, the voltmeter being electrically connected to a generator mounted on one of the side wheel assemblies and operatively connected to the wheel thereof to produce electrical energy for the voltmeter, and (b) valve control means for adjustably selecting the rate of application of a selected substance to be sprayed by the spraying means mounted on the frame.

* * * * *